INVENTOR:
MILOS KROFTA
By Jacob L. Kollin,
Attorney

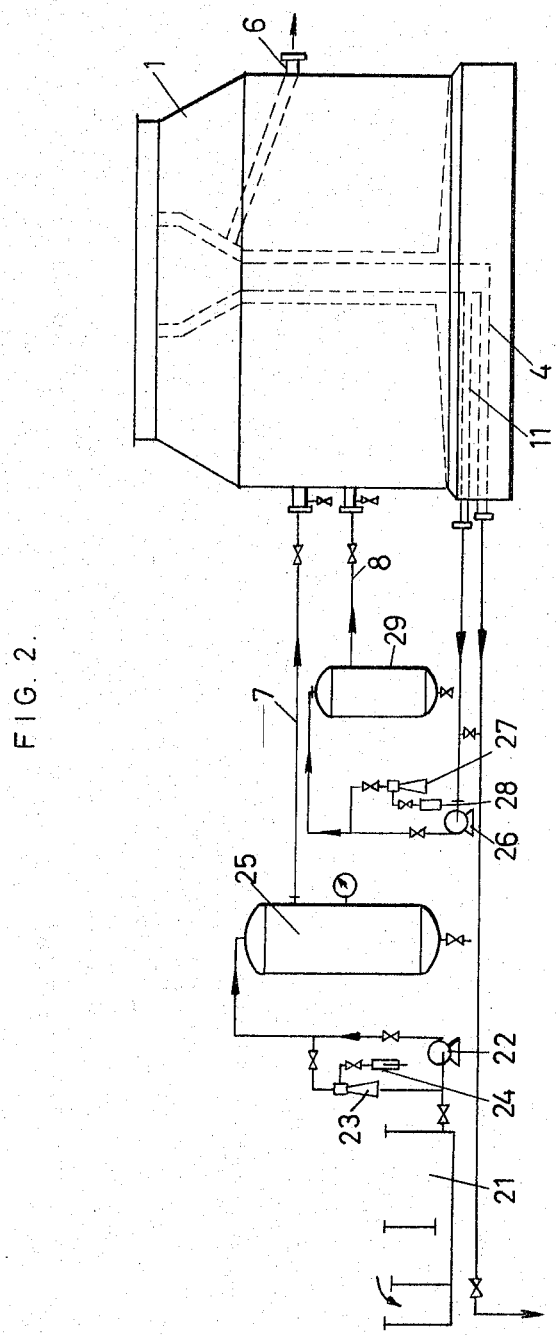

March 7, 1967 M. KROFTA 3,307,701
APPARATUS FOR PURIFICATION OF UNCLARIFIED WASTE WATER
Filed Nov. 4, 1963 3 Sheets-Sheet 3
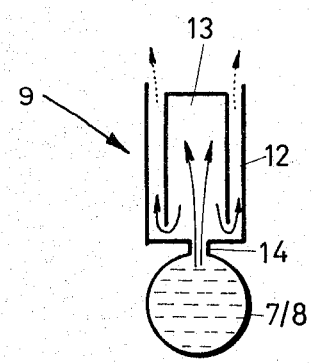
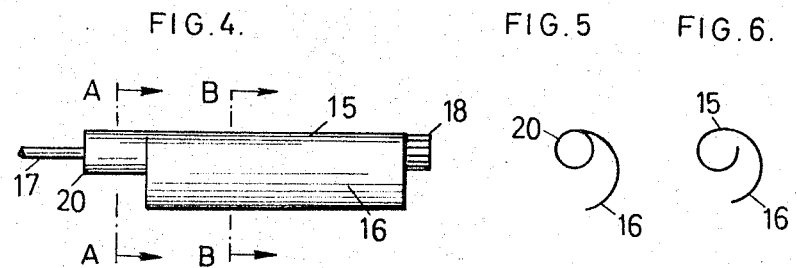
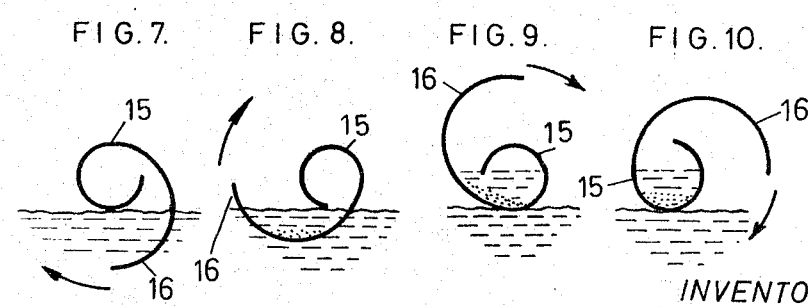
INVENTOR:
MILOS KROFTA
By Jacob L. Kollin,
Attorney

United States Patent Office

3,307,701
Patented Mar. 7, 1967

3,307,701
APPARATUS FOR PURIFICATION OF
UNCLARIFIED WASTE WATER
Milos Krofta, 58 Jokun Ave., Lenox, Mass. 01240
Filed Nov. 4, 1963, Ser. No. 321,123
7 Claims. (Cl. 210—195)

The invention relates to a process and apparatus for the purification of unclarified waste water, more particularly in the paper-making, cellulose and like industries, and it operates on the flotation principle. Usually, for this purpose, there are added to the slurry, that is to say, the waste water to be purified, aqueous suspensions which render the substances to be separated, for example fibres, difficult to wet, so that these substances are floated up by the gas, for example compressed air injected into the slurry, when the said gas is liberated in the pulp catcher, where they collect in a layer and can then be removed from the surface.

When solids which are difficult to flocculate, and therefore require comparatively large amounts of flotation agents are employed, the addition of flotation agents is discarded. This is also more particularly necessary where waste-water purification has to be carried out and the recovered substance is practically worthless.

In such cases, the procedure according to the invention is such that the whole of the waste water to be purified is mixed with gas under pressure, preferably air, and the release of the gas, for example, air, dissolved in this way in the waste water takes place directly in the pulp catcher itself. For this purpose the waste water containing, for example, dissolved compressed air, is dispersed as uniformly as possible in the pulp catcher and is relieved directly at the dispersion points. In this way, the possibility of coagulation of the air is kept as brief as possible. The air bubbles which are thus still microscopically small after release at the dispersion points adhere to the solids or fibres and endow them with the necessary buoyancy for ascending to the surface of the quantity of liquid in the pulp catcher. The clear water, which is comparatively heavier, falls to the bottom under the pressure of the incoming water, passes finally through the bottom screens into a collecting chamber, ascends a rising pipe, whereby the surface of the liquid in the pulp catcher is kept at the desired level, and is finally discharged over an overflow through a pipe as clear water.

In a further development of the process, the supply of air-charged water can occur on two superimposed planes, air-charged waste water being supplied to the upper plane, the first stage, and air-charged clear water being supplied to the second plane below, called the second stage. This second clear water stream is advantageously taken from the clear water in the pulp catcher, is enriched with compressed air, for example, and is returned to the pulp catcher. In this arrangement, the descending purified clear water leaving the first stage passes the second stage, from which a second stream of very small bubbles ascends, possibly carrying upwardly with it, and thus floating, the last solid or fibre particles still present in the descending clear water. This additional flow reinforces the rate of flotation, i.e. the ascent of particles of substance caused by the air bubbles of the first stage. The ascending solid substance gradually thickens further. Since there are no flotation agents, the individual particles of fibres of the thick pulp are practically not bound together. It is therefore necessary to carry out the removal of the thick pulp carefully, that is to say without turbulence, continuously or intermittently.

The invention furthermore relates to an apparatus for carrying out the process as described. According to the invention said apparatus comprises a preferably cylindrical housing and a built-in pipe system with dispersing nozzles provided thereon for the waste water, enriched for example with compressed air, which is to be passed through the pipe system, the dispersing nozzles being so arranged that they are distributed substantially uniformly over the entire housing cross-section. On the interior of the housing, preferably in the centre axis, is a rising pipe, which is preferably connected below a bottom screen with the rest of the housing, and the height of which determines the level of the liquid in the pulp catcher. The rising pipe co-operated with a down pipe, which in its turn opens into the clear water outlet pipe. At the upper edge of the housing is at least one thick-pulp collecting chamber, preferably between the upper inner edge of the housing and the upper outer edge of the rising pipe. The thick pulp collecting chamber has a suitable discharge pipe, leading into the open or to a tank, from which the fibre particles, separated for example from paper-making waste water, can be supplied directly for reutilization. Devices are further provided by means whereof the waste water and the clear water can be supplied, and air, for example, can be injected under pressure into the waste water and clear water.

The pipe disperser system comprises preferably dispersing nozzles distributed in two superimposed planes.

For improving the formation of the thick-pulp layer on the surface of the liquid in the pulp catcher, the housing thereof may be tapered conically upward on the outside and/or inside.

For relieving the waste water or clear water containing dissolved air, for example, within the pulp catcher housing, devices are provided whereby in a very short time release of the compressed air dissolved in the issuing liquid occurs in the form of a very large quantity of microscopically fine bubbles. An advantageous embodiment according to the invention comprises a vertically upright sleeve having a small central orifice in the bottom and a short connecting piece to the associated pipe of the dispersing system. Inserted in this upwardly open sleeve from above is a second smaller sleeve with a closed top and a substantially uniform annular spacing from the first sleeve. The air-changed waste water flows from below into the smaller sleeve, is there deflected, is relieved and only microscopically very finely dispersed air bubbles now issue upwardly together with the liquid from the annular space between the smaller and larger sleeve.

In the apparatus according to the invention a continuous discharge of thick pulp may be obtained, for example, by simple overflow into a collecting trough, advantageously of annular construction. Another possibility lies in the intermittent discharge of thick pulp by means of a thick-pulp skimmer. According to the invention, this comprises at least one substantially hollow cylinder revolving on its axis and sweeping over the surface of the pulp catcher preferably in a circular movement, to the peripheral surface of which is connected a spirally curved skimmer plate, which according to the arrangement of the thick-pulp collecting device conveys the skimmed-off thick pulp inwardly or outwardly to said collecting trough, whence the thick pulp returns to the manufacturing plant for further utilization.

A constructional example of an apparatus for carrying out the process according to the invention is represented diagrammatically in the drawing, with reference to which further details will be explained. In this drawing:

FIG. 2 is a diagram of the entire plant for operating the pulp catcher, the latter being shown on a shorter scale;

FIG. 3 is a dispensing nozzle diagrammatically in section;

FIG. 4 shows the thick-pulp spiral skimmer diagrammatically apart, with

Figure 1:
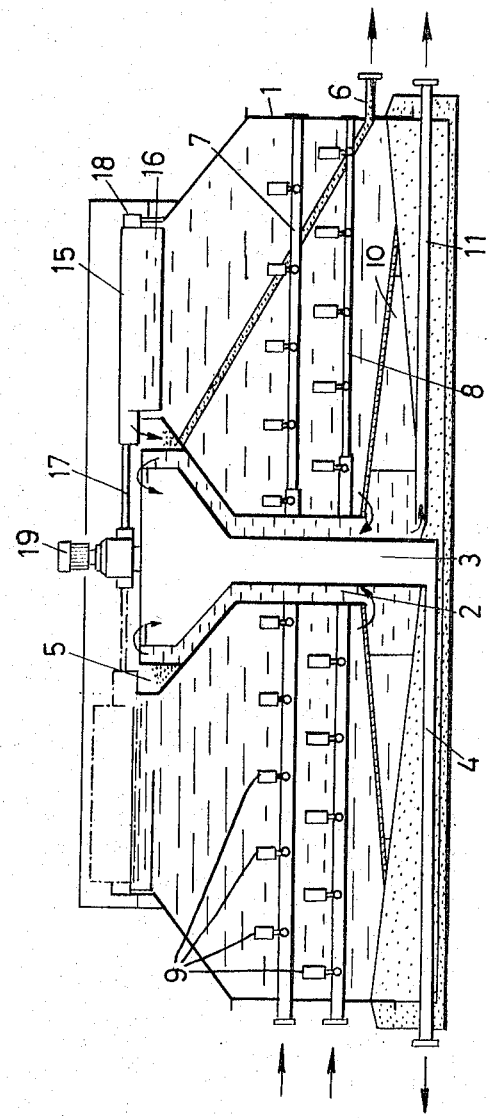
FIG. 1 shows the pulp catcher in section.

FIG. 5 a cross section on the line A—A in FIG. 4, and

FIG. 6 a cross section on the line B—B in FIG. 4;

FIGS. 7–10 show different positions of the thick-pulp spiral skimmer in its rotary movement.

The pulp catcher comprises the cylindrical housing 1 with central rising pipe 2 for the waste water and spaced built-in fall pipe 3 for the clear water, which is discharged through the bottom pipe 4. This arrangement ensures an always constant level of the liquid in the pulp-catcher housing, whereby the floated thick-pulp layer has a definite position. In the constructional example, the cylindrical housing tapers conically to the open top, but this is not absolutely essential. Behind the conical inner wall of the housing is a thick-pulp collecting trough 5, from which the thick pulp is discharged through the pipe 6 and supplied at once for reutilisation. In the interior of the housing 1, in two planes one above the other, are pipe systems 7 and 8 composed of a number of pipes having a plurality of dispersing nozzles 9 attached thereto, the said nozzles being so arranged as to provide a practically uniform dispersion of the water-air mixture issuing from the dispersing nozzles in the inner space. Below the bottom screen 10 of the housing 1 is a further pipe 11 for the discharge of about 10–20% of the clear water produced. As shown diagrammatically in FIG. 3, the dispersing nozzles 9 consist of an upright sleeve 12 and a sleeve 13 inserted invertedly from above in the first-mentioned sleeve. The pipe system 7/8 is connected in each case by a pipe hole and a short connecting piece 14 to the bottom orifice of the sleeve 12. The issuing water with the air dissolved in its shoots into the sleeve 13, is deflected and relieved, so that as indicated by the arrows shown, water containing microscopically small and very finely divided air bubbles emerges at the free upper annular edge between the sleeves 12 and 13, which bubbles become charged with the solids of the surrounding water and float said solids upwardly to the surface of the water at the top of the housing.

Discharge of the floated thick pulp is here not effected by continuous overflow over the inner edge into the thick-pulp collecting trough 5, but is skimmed off intermittently by the thick-pulp spiral skimmer according to the invention and is then discharged into the trough 5. The thick-pulp skimmer consists of a substantially hollow casing 15 having a spirally curved skimming plate 16 connected to it. The thick-pulp skimmer is connected to a shaft 17 and at the other end is guided on the outer edge of the housing 1 by means of a roller 18. Through suitable gearing, the motor 19 produces the rotary movement of the thick-pulp skimmer both about its horizontal axis and about its vertical axis. Thus, as will be gathered from FIGS. 7 to 10, during rotation about its own axis, the thick-pulp skimmer will first dip into and through the floated thick-pulp layer with the skimming plate 16 (FIG. 7), then skims off a certain quantity (FIG. 8) lifts this from the cover layer (FIG. 9) and transports it to the centre (FIG. 10) by way of the closed cylindrical part 20 of part 15 into the thick-pulp collecting trough 5, whence the thick-pulp is discharged through the pipe 6 and immediately thereupon can be supplied for reutilisation.

The plant operates as follows: The waste water is forced from its collecting tank 21 by the pressure pump 22 into the pressure vessel 25, a branched partial stream being charged with air by means of the injector 23, the quantity of which air is adjusted at 24. The air-charged waste water passes from the pressure vessel through the upper pipe to the dispersing system 7 of the first stage, is relieved at the dispersing nozzles 9, the thick-pulp floats up and the clear water descends, as hereinbefore described. Through the pipe 11 about 10 to 20% of the clear water produced in the pulp catcher is aspirated by a second pressure pump and forced into the second pressure vessel, where a partial stream is charged with compressed air by means of the injector 27 and preconnected air-quantity regulator 28, in the same way as the water to be clarified was charged in the circuit 22, 23, 24, 25. The air-charged partial stream of clear water from the second pressure vessel 29 passes into the pipe system 8 of the second stage is there relieved at the dispersing nozzles 9 and produces the hereinbefore described second flow with the described effects.

What I claim is:

1. Apparatus for the purification of unclarified waste water, comprising a housing having an inner wall, a pipe system in said housing for dispersing the waste water in said housing, said pipe system being provided with a plurality of dispersing nozzles, means connected to said pipe system for enriching the waste water with compressed air, a rising pipe having an outer wall for clear water in said housing, a fall pipe for said clear water disposed axially inwardly of said rising pipe, for receiving overflow clear water from said rising pipe, a pair of water outlet pipes, one of said pipes connected to said rising pipe, the other connected to said fall pipe, a thick-pulp collecting trough formed by the outer wall of the upper portion of said rising pipe and disposed between said rising pipe outer wall and the inner wall of said housing, and a pulp discharge pipe communicating with said trough.

2. Apparatus according to claim 1, wherein said pipe system comprises a pair of pipes disposed in superimposed planes, for dispersing waste water, the upper one of said pipes for supplying air-charged waste water forming a first stage and the lower one for supplying air-charged clear water forming a second stage.

3. Apparatus according to claim 2, wherein said dispersing nozzles consist each of an outer sleeve extending upwardly of said pipes and communicating therewith, said outer sleeve having an upper open end and an inner sleeve secured spacedly in said outer sleeve having an upper closed portion adjacent said upper end and a bottom open portion extending part way into said outer sleeve.

4. Apparatus according to claim 3, wherein said nozzles are uniformly spacedly distributed on said pipes.

5. Apparatus according to claim 2 further provided with a collecting tank for waste water, a first pressure vessel, a first pressure pump for forcing the waste water into said pressure vessel, first means connecting said tank to said pump and said pump to said vessel, a first injector for charging compressed air, connected to said first means between said pump and said vessel, means communicating said first pressure vessel being connected to said upper pipe, a second pressure vessel, a second pressure pump, second means connecting said clear water rising pipe outlet pipe with said second pump and said second pump with said second pressure vessel, a second air charging injector for charging the clear water, connected to said second means, means to connect said second vessel to said lower pipe.

6. Apparatus according to claim 1, further provided with at least one thick pulp skimmer mounted for rotation in said housing above said pulp collecting trough and extending into the thick pulp collecting chamber and motive means for said skimmer.

7. Apparatus according to claim 6, wherein said thick-pulp skimmer consists of a hollow casing and a spirally curved skimming plate secured to said casing.

References Cited by the Examiner

UNITED STATES PATENTS

| | | | |
|---|---|---|---|
| 1,236,746 | 8/1917 | Nonnenbruch | 210—221 X |
| 2,388,796 | 11/1945 | Mount | 210—195 X |
| 2,637,737 | 5/1953 | Gibbs. | |
| 2,695,710 | 11/1954 | Gibbs. | |
| 3,179,252 | 4/1965 | Vrablik | 210—44 X |

FOREIGN PATENTS 694,918   7/1963   Great Britain.

OTHER REFERENCES

Barry, A. I., Diffused Air Floats Particles for Waste Disposal, in Chem. Eng., vol. 58, pp. 107–110, April 1951.

Rohlich, G. A., Application of Air Flotation to Refinery Waste Waters, in Industrial and Eng. Chemistry, vol. 46, pp. 304–308, February 1954.

REUBEN FRIEDMAN, *Primary Examiner.*

D. M. RIESS, *Assistant Examiner.*